(12) United States Patent
Becker

(10) Patent No.: US 11,822,466 B2
(45) Date of Patent: Nov. 21, 2023

(54) CREATING AND TESTING A CONTROL-DEVICE PROGRAM

(71) Applicant: dSPACE GmbH, Paderborn (DE)

(72) Inventor: Christian Becker, Paderborn (DE)

(73) Assignee: DSPACE GMBH, Paderborn (DE)

( * ) Notice: Subject to any disclaimer, the term of this patent is extended or adjusted under 35 U.S.C. 154(b) by 115 days.

(21) Appl. No.: 17/557,060

(22) Filed: Dec. 21, 2021

(65) Prior Publication Data

US 2023/0195606 A1   Jun. 22, 2023

(51) Int. Cl.
 *G06F 9/44* (2018.01)
 *G06F 11/36* (2006.01)
 *G06F 11/32* (2006.01)

(52) U.S. Cl.
 CPC ........ *G06F 11/3688* (2013.01); *G06F 11/323* (2013.01); *G06F 11/3684* (2013.01); *G06F 11/3692* (2013.01)

(58) Field of Classification Search
 None
 See application file for complete search history.

(56) References Cited

U.S. PATENT DOCUMENTS

| | | | | |
|---|---|---|---|---|
| 8,966,443 B2* | 2/2015 | Morgan | ............... | G06F 9/44521 |
| | | | | 717/120 |
| 11,663,115 B2* | 5/2023 | Xiao | ................... | G06F 11/3684 |
| | | | | 717/124 |
| 2013/0111505 A1* | 5/2013 | Frick | ..................... | G06F 11/263 |
| | | | | 719/328 |
| 2021/0103516 A1* | 4/2021 | De Sousa Bispo | .......................... | |
| | | | | G06F 11/3688 |

FOREIGN PATENT DOCUMENTS

EP   2 685 282 A1   1/2014

* cited by examiner

*Primary Examiner* — Qamrun Nahar
(74) *Attorney, Agent, or Firm* — LEYDIG, VOIT & MAYER, LTD.

(57) ABSTRACT

A method provides an intervention point for manipulating a variable of a runtime environment for testing a control-device program component to be tested in a test environment. Software of the control-device program component, in accordance with the AUTOSAR standard, is divided into three layers, wherein the three layers include a layer of program components, a layer of the runtime environment, and a layer of device-related basic programs. The layer of the program components has a test scenario program component for providing input values and a program component for receiving output values and displaying the test result. The method includes: providing the control-device program component to be tested with interfaces that are each defined in accordance with the AUTOSAR standard; and creating an executable program of the control-device program component to be tested and of the test scenario program component.

14 Claims, 3 Drawing Sheets

CREATING AND TESTING A CONTROL-DEVICE PROGRAM

FIELD

The invention relates to a method for creating and testing a control-device program and to a corresponding development device.

BACKGROUND

The graphical representation of software components and their mutual interconnection is known in the field of software design. In the case of AUTOSAR, this includes, among other things, the representation of software components with their ports and interfaces and the representation of the connections between the ports. EP 2 685 282 B1 describes making available interfaces of software components for testing purposes so that data can be modified via variables and interfaces of a virtual control device (V-ECU) can be routed outward and connected to further participants in the simulation system, e. g., environmental models. This is herein also referred to as the creation of an intervention point.

However, it has not yet been possible to tell from a conventional graphical representation of software components and their mutual interconnection whether an interface of a virtual control device (V-ECU) can be routed outward or whether this interface is already routed outward. It has therefore hitherto been necessary for a user to know the software architecture and the interfaces that are to be made available in order to then make the appropriate selection in the configuration of the interfaces that are to be made available. Here, he must potentially change between different data and views and create a mapping between the software architecture and its V-ECU test interfaces. Such a procedure is time-consuming and prone to errors.

SUMMARY

In an exemplary embodiment, the present invention provides a method for providing an intervention point for manipulating a variable of a runtime environment for testing a control-device program component to be tested in a test environment. Software of the control-device program component, in accordance with the AUTOSAR standard, is divided into three layers, wherein the three layers include a layer of program components, a layer of the runtime environment, and a layer of device-related basic programs. The layer of the program components has a test scenario program component for providing input values and a program component for receiving output values and displaying the test result. The method includes: providing the control-device program component to be tested with interfaces that are each defined in accordance with the AUTOSAR standard; and creating an executable program of the control-device program component to be tested and of the test scenario program component. The created executable program comprises generating the runtime environment, and the runtime environment provides a communication channel for transmitting the input and output values. A component testing service is provided as part of a further component, which part contains a description for a port and an interface of the runtime environment in accordance with the AUTOSAR standard and provides the port and the interface of the runtime environment as an intervention point for manipulating the variable of the runtime environment. A graphical representation of the port and the interface that are provided as the intervention point for manipulating the variable of the runtime environment is part of a graphical representation of an architecture of at least a part of the runtime environment and includes a graphical mark indicating that the port and the interface are provided as the intervention point for manipulating the variable of the runtime environment. The component testing service allows access of the test scenario program component to the variable of the runtime environment via corresponding code generation for the runtime environment including the port and the interface that are provided as the intervention point for manipulating the variable of the runtime environment, wherein the variable determines or describes or influences a process running via the communication channel.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
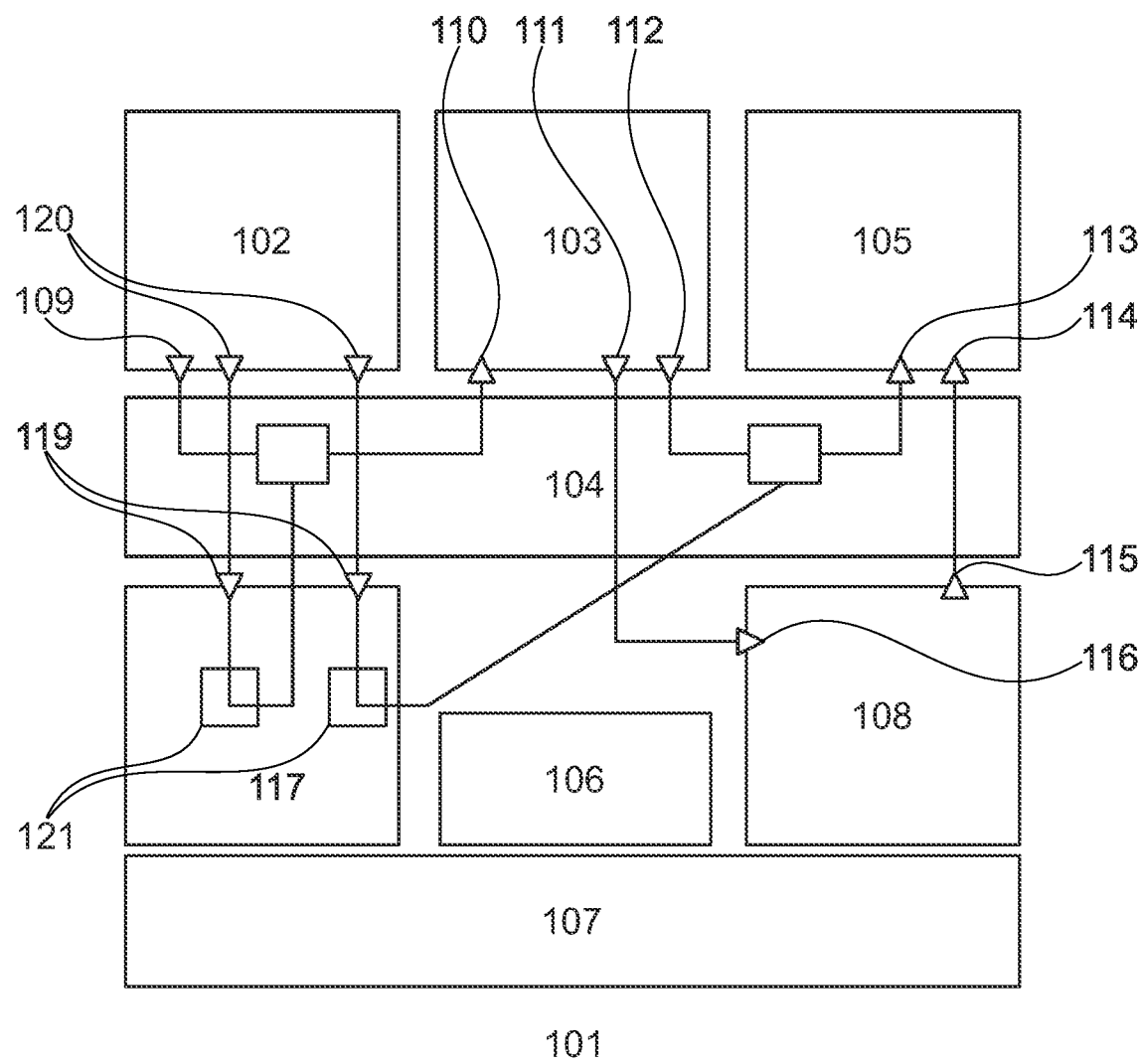
FIG. 1 schematically shows the structure of a virtual test environment according to an exemplary embodiment of the invention.

In an exemplary embodiment, a method provides an intervention point for manipulating a variable of a runtime environment for the testing of a control-device program component to be tested in a test environment, the software of which, in accordance with the AUTOSAR standard, is divided into three layers, namely into a layer of the program components, a layer of the runtime environment, and a layer of the device-related basic programs, wherein the layer of the program components has a test scenario program component for providing input values and a program component for receiving output values and displaying the test result. The method includes: providing the control-device program component to be tested with interfaces that are each defined in the AUTOSAR standard, and creating an executable program of the control-device program component to be tested and of the test scenario program component, wherein this creation comprises generating the runtime environment, and the runtime environment provides a communication channel for transmitting the input and output values, wherein a component testing service is provided as part of a further component, which part contains a description for a port and an interface of the runtime environment in accordance with the AUTOSAR standard and provides this port and this interface of the runtime environment as an intervention point for manipulating the variable of the runtime environment, and wherein the component testing service allows access of the test scenario program component to the variable of the runtime environment via corresponding code generation for the runtime environment including the port and the interface that are provided as an intervention point for manipulating the variable of the runtime environment, wherein the variable determines or describes or influences a process running via the communication channel.

The control-device program is provided for controlling an electronic control unit in a vehicle. The term "development device" can be understood in the context of the present invention as a device via which a user can develop, model, and create a control-device program. The control-device program created can then be used for simulation and/or testing. In the context of the present invention, the term "control-device program" can be understood as a measurement, control, regulation, and/or calibration program for controlling an electronic control unit in a vehicle. The term "control-device program" includes not only individual program components with different functions but also complex program architectures with several interconnected program components. The term "electronic control unit" can be understood in the context of the present invention as a control system, for example a control device in a motor vehicle. The electronic control unit can be used, for example, for measuring, controlling, regulating, and/or calibrating vehicle components. The term "vehicle" is used below as a comprehensive designation for water vehicles, land vehicles, aircraft, spacecraft, and/or combinations thereof.

Exemplary embodiments of the invention simplify the identification of interfaces that can be made available.

According to the invention, a method is provided for providing an intervention point for manipulating a variable of a runtime environment for testing a control-device program component to be tested in a test environment, the software of which, in accordance with the AUTOSAR standard, is divided into three layers, namely into a layer of the program components, a layer of the runtime environment, and a layer of the device-related basic programs, wherein the layer of the program components has a test scenario program component for providing input values and a program component for receiving output values and displaying the test result, wherein the method comprises the following method steps: providing the control-device program component to be tested with interfaces that are each defined in accordance with the AUTOSAR standard, and creating an executable program of the control-device program component to be tested and of the test scenario program component, wherein this creation comprises generating the runtime environment and the runtime environment provides a communication channel for transmitting the input and output values, wherein a component testing service is provided as part of a further component, which part contains a description for a port and an interface of the runtime environment in accordance with the AUTOSAR standard and provides this port and this interface of the runtime environment as an intervention point for manipulating the variable of the runtime environment, wherein a graphical representation of the port and the interface that are provided as an intervention point for manipulating the variable of the runtime environment is part of a graphical representation of the architecture of at least a part of the runtime environment and includes a graphical mark indicating that this port and this interface are provided as an intervention point for manipulating the variable of the runtime environment, and wherein the component testing service allows access of the test scenario program component to the variable of the runtime environment via corresponding code generation for the runtime environment including the port and the interface that are provided as an intervention point for manipulating the variable of the runtime environment, wherein the variable determines or describes or influences a process running via the communication channel.

Even with the increasing complexity of today's control-device programs, exemplary embodiments of the invention provide flexible testing of the various program components participating in the composite test at various stages of development in a particularly user-friendly manner. In addition to the tasks that are performed by the individual program components, the responses of these components are also tested for errors which occur in the communication of program components with one another, such as a faulty signal transmission. For testing purposes, it is also advantageous if individual program-internal variables can be manipulated during a test, namely via the access of the test scenario program component to the variable of the runtime environment, without the need to configure accordingly the simulation or the control-device program component each time.

Communication of the program components participating in the test takes place via a common runtime environment. Subsequent intervention in generated executable programs based on the integrated program components and the runtime environment for testing certain error states or certain predetermined events within communication is to be avoided since the underlying test scenario program components do not receive the information required for reproducing the error state at a later stage with a newly generated executable program. On the other hand, the generation in each case of a separate runtime environment for each program component in order to inject a communication error between the program components causes an unnecessary complexity of the test environment.

The invention thus makes it possible to influence the behavior of the runtime environment from the outside, namely via the access of the test scenario program component to the variable of the runtime environment within the scope of a component test or even of a component composite test. Test scenario program components can thus be reused often without further adaptation. A component testing service of the runtime environment can be understood within the context of the present invention as a description for a port and an interface of the runtime environment in accordance with the AUTOSAR standard as an intervention point for manipulating a variable of the runtime environment. This description is made known to the simulator process, for example by connecting the component testing service to, for example, a test scenario program component. During the automatic creation of the executable program, the corresponding intervention interface for the runtime environment is then created according to the defined intervention point. An interface of the test scenario program component can then be connected to the intervention interface of the runtime environment, i.e., the intervention point, and thus act on the communication between the program components or internal variables of the individual program components.

Another advantage in this context is that, with the generation of an executable program that includes the generation of a runtime environment, in addition to the program variable descriptions that are usually generated, runtime environment variables are now also described so that they can be directly set with the aid of experimentation and test automation tools. An aspect of the invention is that a part of a graphical representation of the architecture of a part of the runtime environment is also a graphical representation of the port and the interface that are provided as an intervention point for manipulating the variable of the runtime environment. Here, the graphical representation of the port and the interface are to include a graphical mark indicating that this port and this interface are provided as an intervention point for manipulating the variable of the runtime environment. Such a graphical representation can significantly facilitate the creation and management of intervention points for a user.

The further component with the component testing service is preferably provided in the layer of the device-related basic programs or in the layer of the runtime environment.

According to a preferred embodiment of the invention, it is provided that the intervention for manipulating the variable of the runtime environment is provided via a context menu that can be called up in the graphical representation via a pointing device. Such a pointing device is preferably a computer mouse or a touchpad of a computer. This also facilitates the creation of intervention points for a user since, in connection with the graphical representation of the possibility of creating an intervention point, the actual creation of an intervention point is also provided at the same time. It is preferably provided in this context that the context menu can be called up when a pointer, such as a mouse pointer, that is movable in the graphical representation, has been moved into the area of the graphical representation of the port and the interface. In this context, it is preferred that the area for calling up the context menu is provided directly above the graphical representation of the port and the interface.

In principle, the graphical mark indicating that the port and the interface are provided as an intervention point for manipulating the variable of the runtime environment can be designed very differently. However, it is preferably the case that the graphical mark indicating that the port and the interface are provided as an intervention point for manipulating the variable of the runtime environment comprises a predetermined symbol and/or a predetermined color mark. In this case, it is preferred for a graphical mark to be effected via a predetermined symbol and/or via a predetermined color mark if the port and the interface are already in use as an intervention point for manipulating the variable of the runtime environment. In addition, according to a preferred embodiment of the invention, the graphical mark indicating that the port and the interface are already in use as an intervention point for manipulating the variable of the runtime environment is a graphical mark differing from the graphical mark indicating that the port and the interface are provided as an intervention point for manipulating the variable of the runtime environment.

According to a preferred embodiment of the invention, the variable of the runtime environment is given by a parameter, a variable, or a function of the runtime environment. Program components that communicate with one another via a runtime environment generally call API functions (API=application program interface) that represent basic functions for application programs. Each test scenario program component contains a runtime read call as well as a runtime write call for transmitting a data element via the runtime environment. In this context, it is preferably furthermore provided that the variable of the runtime environment is a status parameter that describes the status of a data element transmitted via a runtime read call or a runtime write call, wherein the status describes the validity or the trustworthiness or an error type of the data element. Via direct access to the parameter, a desired status can be set, and thus a defined error injected, and the response of the control-device program component to this error can be tested.

Furthermore, according to a preferred embodiment of the invention, it is provided that the variable of the runtime environment is a runtime environment event parameter that enables a runtime environment event to be triggered. This parameter allows a runtime environment event to be triggered, as defined in the AUTOSAR standard. For example, triggering a "DataReceivedErrorEvent" can trigger an error message to the sending program component. As explained in the description of the AUTOSAR standard, the events "DataWriteCompleteEvent" or "Background/TimingEvent" are triggered at regular intervals. By the direct access to the event parameter, each of these events can be selectively triggered.

It is also preferably the case that the test scenario program component determines a point in time and/or the area of validity in the program sequence at which the predetermined intervention in the communication process is to take place. A corresponding instruction in the test scenario program component can be used to determine the precise access, not only in terms of time but also in relation to the individual program components participating in the test. Thus, for example, a variable of the runtime environment for one program component can be manipulated, while the same variable for a different program component remains unaffected. It is also possible to manipulate the variable only at a certain point in time so that the manipulation takes place at a desired time in the program sequence.

According to the invention, provision is furthermore made for a development device for providing an intervention point for manipulating a variable of a runtime environment for testing a control-device program component to be tested in a test environment, the software of which, in accordance with the AUTOSAR standard, is divided into three layers, namely into a layer of the program components, a layer of the runtime environment, and a layer of the device-related basic programs, wherein the layer of the program components has a test scenario program component for providing input values and a program component for receiving output values and displaying the test result, comprising: an electronic computing unit configured to generate an executable program from the control-device program component to be tested, the interfaces of which are defined in accordance with the AUTOSAR standard, and from the test scenario program component, wherein the electronic computing unit is further configured to generate a runtime environment, wherein the runtime environment provides a communication channel for transmitting input and output values, wherein the electronic computing unit is configured to provide a component testing service as part of a further component, which part contains a description for a port and an interface of the runtime environment in accordance with the AUTOSAR standard and provides the port and the interface of the runtime environment as an intervention point for manipulating the variable of the runtime environment, and allows access of the test scenario program component to the variable of the runtime environment via corresponding code generation for the runtime environment including this port and this interface, wherein the variable determines or describes or influences a process running via the communication channel, and wherein the electronic computing unit is connected to a graphic display configured to display a graphical representation of the port and the interface that are provided as an intervention point for manipulating the variable of the runtime environment, as part of a graphical representation of the architecture to display at least a part of the runtime environment, and the graphical representation of the port and the interface that are provided as an intervention point for manipulating the variable of the runtime environment contains a graphical mark indicating that this port and this interface are provided as an intervention point for manipulating the variable of the runtime environment.

Here, too, according to a preferred embodiment of the invention, the graphic display is configured to provide the intervention for manipulating the variable of the runtime environment via a context menu that can be called up in the graphical representation via a pointing device.

The invention is explained in more detail below on the basis of a preferred exemplary embodiment with reference to the drawings.

FIG. 1 schematically shows the structure of a virtual test environment 101, according to a preferred exemplary embodiment of the invention, with its individual components and their mutual connection. In this case, a subdivision into three layers can be seen. The top layer here is formed by the integrated program components 102, 103, and 105, which define the functionalities of a control-device program. A layer with device-related basic programs 106 and 108 forms the foundation of the structure. The connection layer 104 represents the runtime environment, via which the program components interact with one another and/or with the basic programs.

With development devices, such as the applicant's SystemDesk program, it is possible to model and test a program component but also a composite of several program components. Here, the connection to a simulation unit 107 simulates the functionality and the interaction of the integrated program components, i.e., the program consisting of one program component or a plurality of program components is executed by the simulation unit 107.

Here, the interface 110 of a control-device program component 103 to be tested is connected to the interface 109 of a test scenario program component 102. With the aid of the test scenario program component 102, a test signal for the program component 103 to be tested is generated in the simulation and then transmitted as an output signal from the test scenario program component 102 via the runtime environment as an input signal for the control-device program component 103. The test result can be read out from the memory of the diagnostic event monitor 108.

The program components communicate with one another via the runtime environment 104. As a connection layer, it provides the program components with a platform that is independent of the operating system 106 and provides the program components with basic functions for the communication of the program components with one another, such as read and write calls. The creation of the runtime environment and the underlying program code is here carried out automatically on the basis of the definitions and specifications of the integrated program components. The runtime environment is accordingly generated anew for each new constellation of integrated program components. The communication channel, which is mapped by the runtime environment, here corresponds to a signal transmission via a bus in the electronic control unit that is to be realized. The functionality of the control-device program component is tested in the case of malfunctions or failures of the bus and thus of the communication channel.

The layer of the device-related basic programs also contains a component 117 which contains descriptions of ports and interfaces in accordance with the AUTOSAR standard for the runtime environment. Alternatively, the component 117 may be provided in the layer of the runtime environment 104. These descriptions may be integrated into the virtual test environment 101 as component testing services. The test scenario program component 102 is now connected not only via the interface 109 to the interface of the control-device program component 103 to be tested but also via the interface 120 to an interface 119 of the runtime environment that allows access to a variable of the runtime environment via the component testing service 121. In this way, error states relating to the communication channel between the interface 109 and the input 110 of the control-device program component 103 to be tested or also between the output of the control-device program component 112 and the input 113 of a further program component 105 can be fed in via the test scenario program component 102. This further program component 105 can be an observer program component. The runtime environment 104 is automatically generated after incorporation of all program components, including the component testing services 121.

Figure 2:
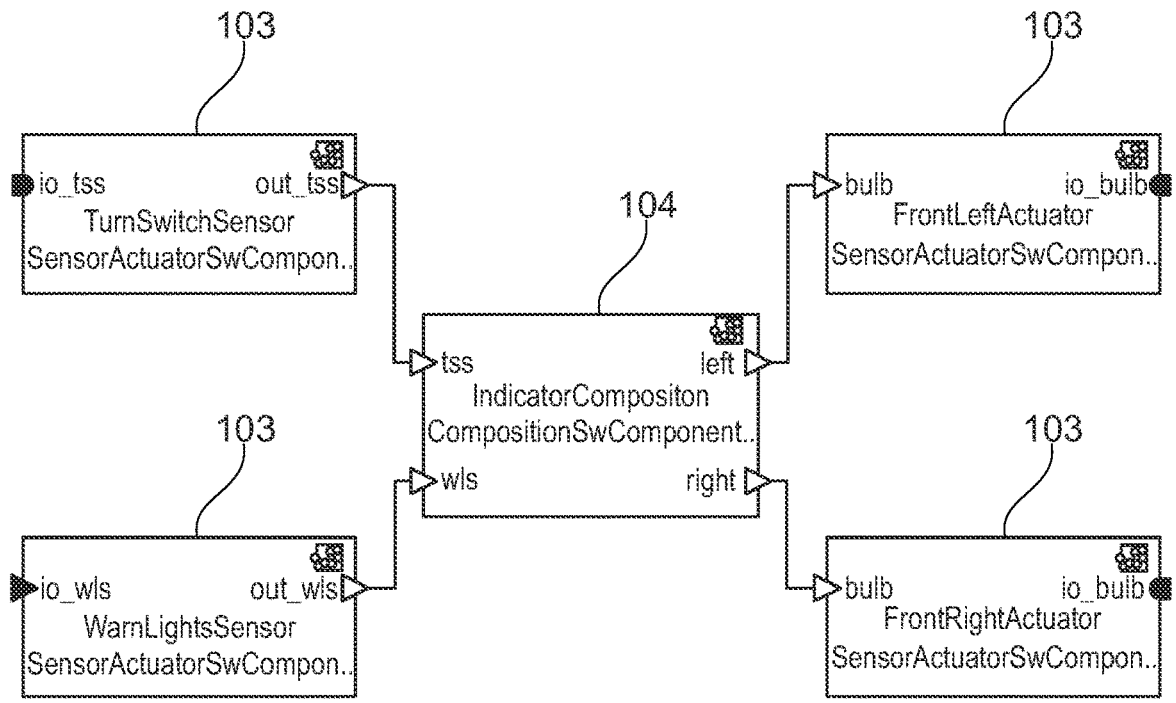
FIG. 2 schematically shows, for the structure of the virtual test environment of FIG. 1, a graphical representation of four control-device program components, which are part of the architecture of the runtime environment, when no port and no interface are provided as an intervention point for manipulating a variable of the runtime environment.

FIG. 2 illustrates how, according to a preferred exemplary embodiment of the invention, four control-device program components 103, which are part of the architecture of the runtime environment 104, are graphically represented when no port and no interface are provided as an intervention point for manipulating a variable of the runtime environment 104. The four control-device program components 103 are designated according to their functions by "TurnSwitchSensor," "WarnLightsSensor," "FrontLeftActuator," and "FrontActActuator." In the programming, the control-device program components 103 are connected to one another via the component "IndicatorComposition" of the runtime environment 104. The representation of the ports and interfaces 119 of the runtime environment can be seen as small white triangles with a black border.

It can now be seen in FIG. 3 that a graphical representation of ports and interfaces 119 that are provided as an intervention point for manipulating a variable of the runtime environment 104, is part of the graphical representation, previously described with reference to FIG. 2, of a part of the architecture of the runtime environment 104 and here contains such a graphical mark that explicitly indicates that a particular port and a particular interface 119 are provided as an intervention point for manipulating the variable of the runtime environment 104. In the present case, this is effected by such ports and interfaces 119 being shown as small black triangles. In addition, the control-device program components 103, which are not yet executable, are provided with a warning symbol, in the present case with a black triangle which contains a bright exclamation mark.

Figure 3:
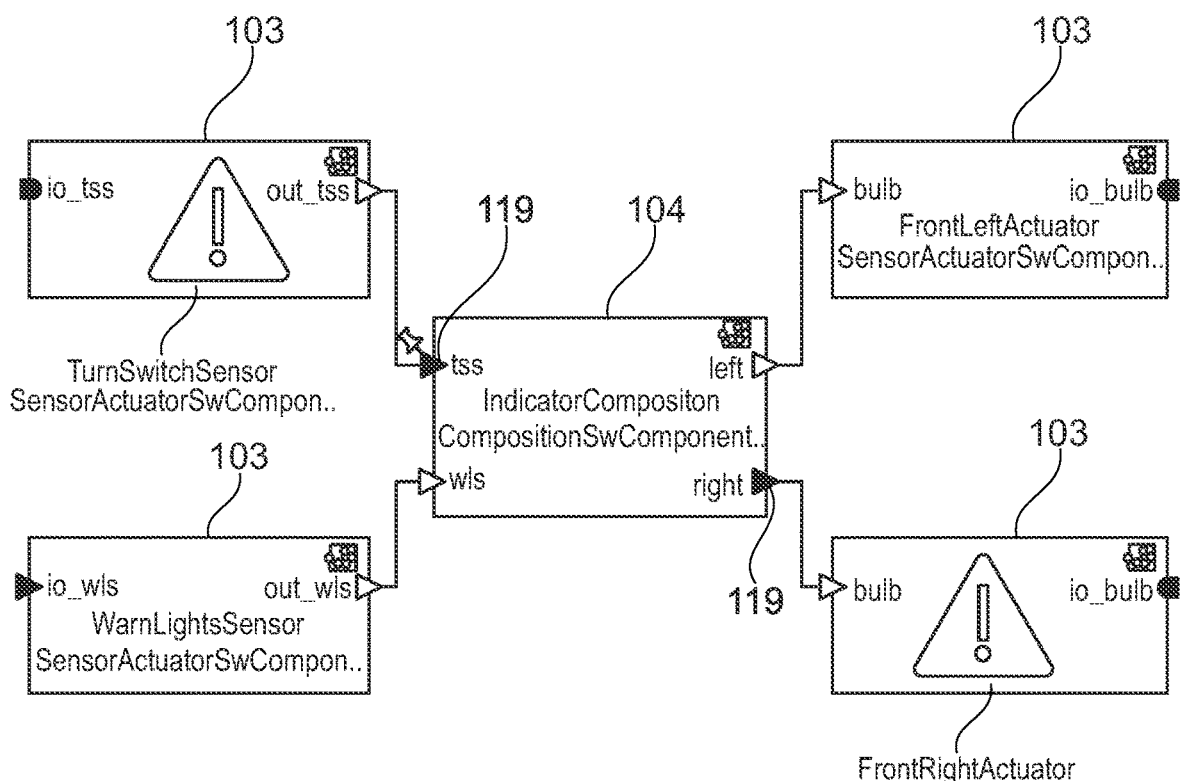
FIG. 3 schematically shows, for the structure of the virtual test environment of FIG. 1, a graphical representation of four control-device program components, which are part of the architecture of the runtime environment, when ports and interfaces are provided as an intervention point for manipulating a variable of the runtime environment.

FIG. 3 furthermore shows that a graphical mark is effected via a predetermined symbol of such a port and of such an interface 119 that are already in use as an intervention point for manipulating the variable of the runtime environment 104. In this case, these are the port and the interface with the designation "tss," which have been marked here by a stylized black pin.

Figure 4:
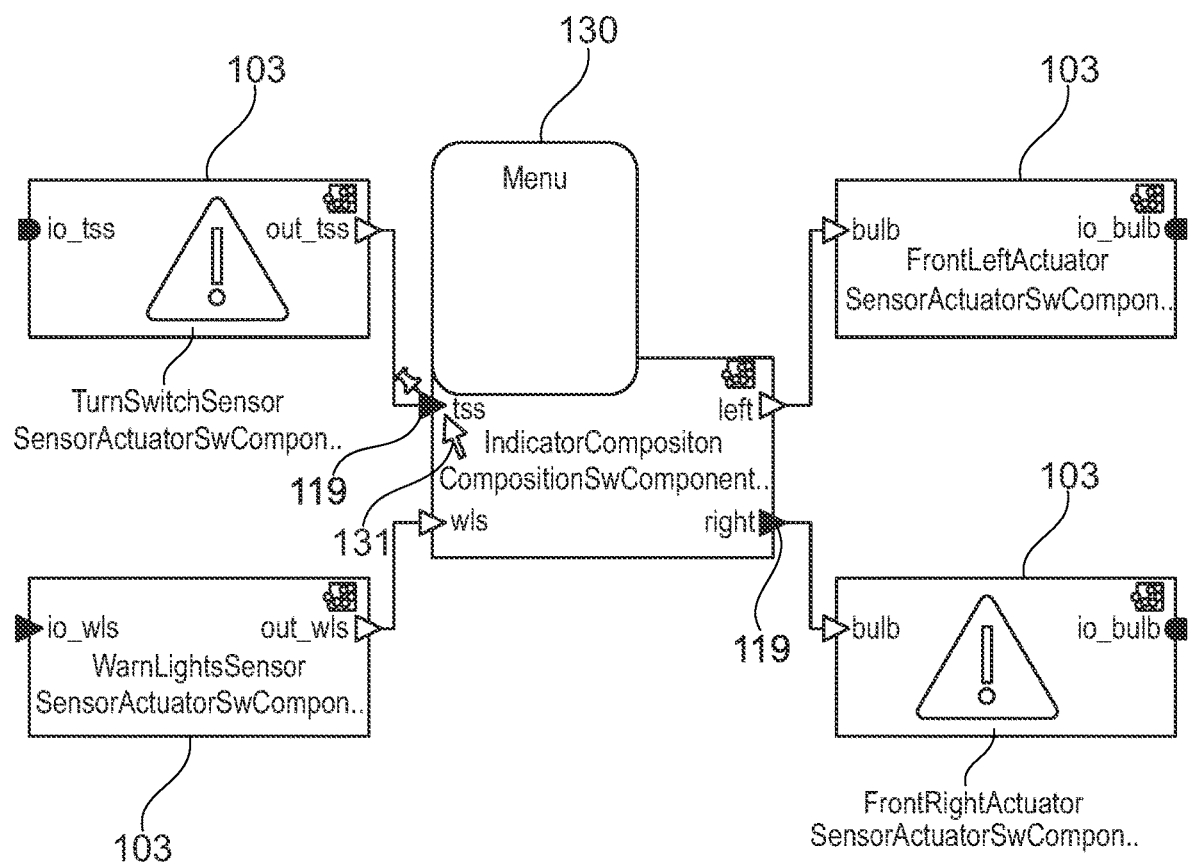
FIG. 4 schematically shows the structure of the virtual test environment of FIG. 1 for calling up a context menu for setting a port and an interface as the intervention point for manipulating a variable of the runtime environment.

It can be seen in FIG. 4 that the intervention for manipulating a variable of the runtime environment 104 is provided via a context menu 130 which can be called up in the graphical representation via a mouse pointer 131. Such a call of the context menu 130 is then made possible when the mouse pointer 131 has been moved into the area of the graphical representation of the port and of the interface 119, wherein the area for calling the context menu 130 is provided directly above the graphical representation of the port and the interface 119.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

| | |
|---|---|
| Test environment | 101 |
| Test scenario program component | 102 |
| Control-device program component | 103 |
| Runtime environment | 104 |
| Program component | 105 |
| Device-related basic programs | 106, 108 |
| Interfaces | 110, 111, 112 |
| Further component | 117 |
| Interface as an intervention point | 119 |
| Component testing service | 121 |
| Context menu | 130 |
| Mouse pointer | 131 |

The invention claimed is:

1. A method for providing an intervention point for manipulating a variable of a runtime environment for testing a control-device program component to be tested in a test environment, wherein software of the control-device program component, in accordance with AUTOSAR standard, is divided into three layers, wherein the three layers include a layer of program components, a layer of the runtime environment, and a layer of device-related basic programs, wherein the layer of the program components has a test scenario program component for providing input values and a program component for receiving output values and displaying a test result, wherein the method comprises:

providing the control-device program component to be tested with interfaces that are each defined in accordance with the AUTOSAR standard; and creating an executable program of the control-device program component to be tested and of the test scenario program component, wherein the created executable program comprises generating the runtime environment, and the runtime environment provides a communication channel for transmitting the input and output values;

wherein a component testing service is provided as part of a further component, which part contains a description for a port and an interface of the runtime environment in accordance with the AUTOSAR standard and provides the port and the interface of the runtime environment as an intervention point for manipulating the variable of the runtime environment;

wherein a graphical representation of the port and the interface that are provided as the intervention point for manipulating the variable of the runtime environment is part of a graphical representation of an architecture of at least a part of the runtime environment and includes a graphical mark indicating that the port and the interface are provided as the intervention point for manipulating the variable of the runtime environment; and wherein the component testing service allows access of the test scenario program component to the variable of the runtime environment via corresponding code generation for the runtime environment including the port and the interface that are provided as the intervention point for manipulating the variable of the runtime environment, wherein the variable determines or describes or influences a process running via the communication channel.

2. The method according to claim 1, wherein the intervention point for manipulating the variable of the runtime environment is provided via a context menu that is accessible in the graphical representation via a pointing device.

3. The method according to claim 2, wherein the context menu is accessible based on a pointer having been moved into the area of the graphical representation of the port and the interface.

4. The method according to claim 3, wherein the area for accessing the context menu is provided directly above the graphical representation of the port and the interface.

5. The method according to claim 1, wherein the graphical mark indicating that the port and the interface are provided as the intervention point for manipulating the variable of the runtime environment comprises a predetermined symbol and/or a predetermined color mark.

6. The method according to claim 1, wherein the graphical mark is effected via a predetermined symbol and/or a predetermined color mark based on the port and the interface already being in use as the intervention point for manipulating the variable of the runtime environment.

7. The method according to claim 6, wherein the graphical mark indicating that the port and the interface are already in use as the intervention point for manipulating the variable of the runtime environment is different from the graphical mark indicating that the port and the interface are provided as the intervention point for manipulating the variable of the runtime environment.

8. The method according to claim 1, wherein the variable of the runtime environment is given by a parameter, a variable, or a function of the runtime environment.

9. The method according to claim 1, wherein the variable of the runtime environment is a status parameter which describes the status of an input or output value, wherein the status describes the validity or the trustworthiness or an error type of the input or output value.

10. The method according to claim 1, wherein the variable of the runtime environment is a runtime environment event parameter that enables a runtime environment event to be triggered.

11. The method according to claim 1, wherein the test scenario program component determines a point in time and/or the area of validity in the program sequence at which the predetermined intervention in the communication process is to take place.

12. A system, comprising:
a graphic display; and
a development device for providing an intervention point for manipulating a variable of a runtime environment for testing a control-device program component to be tested in a test environment, wherein software of the control-device program component, in accordance with AUTOSAR standard, is divided into three layers, wherein the three layers include a layer of program components, a layer of the runtime environment, and a layer of device-related basic programs, wherein the layer of the program components has a test scenario program component for providing input values and a program component for receiving output values and displaying a test result, wherein the development device comprises: an electronic computing unit configured to generate an executable program from the control-device program component to be tested, interfaces of which are defined in accordance with the AUTOSAR standard, and from the test scenario program component;
wherein the electronic computing unit is further configured to generate a runtime environment, wherein the runtime environment provides a communication channel for transmitting the input and output values;
wherein the electronic computing unit is configured to provide a component testing service as part of a further component, which part contains a description for a port and an interface of the runtime environment in accordance with the AUTOSAR standard and provides the port and the interface of the runtime environment as the intervention point for manipulating the variable of the runtime environment, and allows access of the test scenario program component to the variable of the runtime environment via corresponding code generation for the runtime environment including the port and the interface, wherein the variable determines or describes or influences a process running via the communication channel; and
wherein the electronic computing unit is connected to the graphic display;
wherein the graphic display is configured to display a graphical representation of the port and the interface that are provided as the intervention point for manipulating the variable of the runtime environment, as part of a graphical representation of the architecture of at least a part of the runtime environment, and the graphical representation of the port and the interface that are provided as the intervention point for manipulating the variable of the runtime environment includes a graphical mark indicating that the port and the interface are provided as the intervention point for manipulating the variable of the runtime environment.

13. The system according to claim 12, wherein the graphic display is configured to provide the intervention point for manipulating the variable of the runtime environment via a context menu that is accessible via a pointing device in the graphical representation.

14. A non-transitory computer-readable medium having processor-executable instructions for providing an intervention point for manipulating a variable of a runtime environment for testing a control-device program component to be tested in a test environment, wherein software of the control-device program component, in accordance with AUTOSAR standard, is divided into three layers, wherein the three layers include a layer of program components, a layer of the runtime environment, and a layer of device-related basic programs, wherein the layer of the program components has a test scenario program component for providing input values and a program component for receiving output values and displaying a test result, wherein the processor-executable instructions, when executed, facilitate:
providing the control-device program component to be tested with interfaces that are each defined in accordance with the AUTOSAR standard; and
creating an executable program of the control-device program component to be tested and of the test scenario program component, wherein the created executable program comprises generating the runtime environment, and the runtime environment provides a communication channel for transmitting the input and output values;
wherein a component testing service is provided as part of a further component, which part contains a description for a port and an interface of the runtime environment in accordance with the AUTOSAR standard and provides the port and the interface of the runtime environment as the intervention point for manipulating the variable of the runtime environment;
wherein a graphical representation of the port and the interface that are provided as the intervention point for manipulating the variable of the runtime environment is part of a graphical representation of an architecture of at least a part of the runtime environment and includes a graphical mark indicating that the port and the interface are provided as the intervention point for manipulating the variable of the runtime environment; and
wherein the component testing service allows access of the test scenario program component to the variable of the runtime environment via corresponding code generation for the runtime environment including the port and the interface that are provided as the intervention point for manipulating the variable of the runtime environment, wherein the variable determines or describes or influences a process running via the communication channel.

\* \* \* \* \*